United States Patent [19]

Tsuji et al.

[11] Patent Number: 4,725,496

[45] Date of Patent: Feb. 16, 1988

[54] MAGNETIC RECORDING MEDIUM

[75] Inventors: Nobuo Tsuji; Yasuo Nishikawa, both of Kanagawa, Japan

[73] Assignee: Fuji Photo Film Co., Ltd., Kanagawa, Japan

[21] Appl. No.: 916,436

[22] Filed: Oct. 7, 1986

[30] Foreign Application Priority Data

Oct. 7, 1985 [JP] Japan .................. 60-223342

[51] Int. Cl.$^4$ .................................. G11B 5/72
[52] U.S. Cl. .................... 428/340; 427/128; 427/131; 427/132; 428/694; 428/695; 428/704; 428/900; 428/457
[58] Field of Search ............... 427/131, 128, 132; 428/695, 694, 704, 900, 340, 457; 360/134-136

[56] References Cited

U.S. PATENT DOCUMENTS

| | | | |
|---|---|---|---|
| 3,398,011 | 8/1968 | Neirotti | 427/130 |
| 4,107,385 | 8/1978 | Higuchi | 428/695 |
| 4,171,399 | 10/1979 | Allen | 427/132 |
| 4,465,608 | 8/1981 | Gerüm | 427/128 |
| 4,537,824 | 8/1985 | Asano | 428/695 |

Primary Examiner—Ellis P. Robinson
Attorney, Agent, or Firm—Sughrue, Mion, Zinn, Macpeak & Seas

[57] ABSTRACT

A magnetic recording medium is described, comprising a non-magnetic support having provided thereon a ferromagnetic thin metal film, wherein a layer consisting essentially of a boric acid ester compound is provided on the ferromagnetic thin metal film.

9 Claims, No Drawings

MAGNETIC RECORDING MEDIUM

FIELD OF THE INVENTION

The present invention relates to a magnetic recording medium having a ferromagnetic thin metal film as a recording layer and more particularly it relates to a thin metal film type magnetic recording medium having excellent running properties and wear resistance.

BACKGROUND OF THE INVENTION

A coated type magnetic recording medium which is prepared by dispersing magnetic particles or ferromagnetic metal particles such as $\gamma$-$Fe_2O_3$, Co-doped $\gamma$-$Fe_2O_3$, $Fe_3O_4$, Co-doped $\gamma$-$Fe_3O_4$, $CrO_2$, or a Bertholide compound of $Fe_3O_4$ in an organic binder such as a copolymer of vinyl chloride and vinyl acetate, a copolymer of styrene and butadiene, an epoxy resin or a polyurethane resin, coating the resulting coating composition on a non-magnetic support and drying it has widely been used. With the recent increased demand for high density recording, a thin metal film type magnetic recording medium, of which a ferromagnetic thin metal film as a magnetic recording layer is prepared by a vapor-deposition method such as vacuum evaporation, sputtering, or an ion plating or metal plating method such as an electroplating method, or a non-electroless plating method without using a binder has drawn attention and has been developed to put into practice.

In order to realize a magnetic recording medium for high density recording, it is desirable theoretically and experimentally to have high coercive force and to make the medium thinner and thinner. In this connection, a thin metal film type magnetic recording medium is highly desirable, because their thickness is 1/10 less than thickness of the conventional coated tpe magnetic recording medium and saturation magnetic flux density is high.

Particularly, a vacuum evaporation method is very advantageous, because a step for disposing of a waste solution, as is required in a plating method, is unnecessary, the manufacturing process is simple and the speed for precipitating a film is high. As a method for vacuum evaporating a magnetic film having a desirable coercive force and squareness ratio on a magnetic recording medium, an oblique incident evaporation method is disclosed in U.S. Pat. Nos. 3,342,632 and 3,342,633.

However, the ferromagnetic thin metal film type magnetic recording medium has had problems, such as weather resistance, running properties, and wear resistance. Upon recording, reproducing, and erasing magnetic recording on a magnetic recording medium, the medium moves relatively to a magnetic head. On this occasion, the magnetic recording medium must run smoothly and stably without causing contacting, wearing, or damaging the magnetic head. Under these circumstances, it is examined and proposed to provide a lubricating layer or a protective layer in order to improve running properties and durability.

It is disclosed, for example, in Japanese Patent Application (OPI) Nos. 69824/85 and 85427/85 (the term "OPI" as used herein means an "unexamined published application") that a protective layer for a thin metal film type magnetic recording medium is prepared by dissolving thermoplastic resins, thermosetting resins, fatty acids, metal salts of fatty acids, fatty acid esters, or alkyl phosphoric acid esters in an organic solvent and coating it.

However, the thus-obtained thin metal film type magnetic recording medium is not satisfactory and further improvements are still required, because the running properties and wear resistance are not sufficient, and electromagnetic properties are deteriorated because of spacing loss between a magnetic head and a tape due to the thickness of a protective or lubricating layer.

SUMMARY OF THE INVENTION

An object of the present invention is to provide a thin metal film type magnetic recording medium having excellent running properties, wear resistance, and electromagnetic properties.

Accordingly, the present invention is directed to a magnetic recording medium comprising a non-magnetic support having provided thereon a ferromagnetic thin metal film, wherein a layer consisting essentially of a boric acid ester compound is provided on the ferromagnetic thin metal film.

DETAILED DESCRIPTION OF THE INVENTION

The present invention can be attained by providing a layer containing a boric acid ester compound on the surface of a ferromagnetic thin metal film prepared by electroplating, electroless plating, gas phase plating, sputtering, vapor deposion, or ion plating.

Boric acid ester compounds used in the present invention has an alkyl group having preferably from 10 to 30 carbon atoms, and more preferably from 12 to 22 carbon atoms. The ester compounds may be any one of monoester, diester, or triester.

Examples of boric acid ester compounds include aliphatic boric acid esters such as tri-n-octadecyl borate, trihexadecyl borate, tridodecyl borate, trioctyl borate, tri-n-butyl borate, trioleyl borate, di-n-octadecyl borate, didodecyl borate, di-isopropyl borate, dioleyl borate, or dihexadecyl borate, and aromatic boric acid esters such as triphenyl borate, tricresyl borate, diphenyl borate, or dicresyl borate. Among these compounds, boric acid triesters and diesters having an alkyl group or an alkenyl group having 12 to 22 carbon atoms are preferred, such as tri-n-octadecyl borate, trihexadecyl borate, tridecyl borate, trioleyl borate, din-octadecyl borate, didodecyl borate, dioleyl borate, or dihexadecyl borate, and tri-n-octadecyl borate is the most preferred.

At least one compound of the above-described boric acid esters and a conventional lubricating agent used for a magnetic recording medium can be incorporated into a protective or lubricating layer provided on a surface of a magnetic thin metal film of the present invention.

The lubricating agents which can be used in addition to the boric acid ester compounds include a fatty acid; metal soap; fatty acid amide; fatty acid ester; higher aliphatic alcohol; monoalkyl phosphate; dialkyl phosphate; trialkyl phosphate; paraffins; silicone oil; animal and vegetable oil; mineral oil; higher aliphatic amine; inorganic fine particles such as graphite, silica, molybdenum disulfide, or tungsten disulfide; resin particles such as polyethylene, polypropylene, polyvinyl chloride, a copolymer of ethylene and vinyl chloride, or polytetrafluoroethylene; $\alpha$-olefin polymerized compound; unsaturated aliphatic hydrocarbons which are liquid at a normal temperature, and fluorocarbons. The weight ratio of the other lubricating agent/the boric acid ester compounds is generally from 0/100 to 90/10, and preferably from 0/100 to 70/30.

A method for forming a layer (i.e., a protective or lubricating layer) in accordance with the present invention includes a method for dissolving materials in an organic solvent, coating or spraying the coating composition on a support, and drying it; a method for melting materials and coating them on a support; a method for dissolving materials in an organic solvent and dipping a support in the organic solvent to absorb materials on the surface of the support; and a method for forming a monomolecular layer of material on a surface of a support by the Langmuir Brodgett method.

The coverage (amount coated) of a protective or lubricating layer ("coverage" as referred to herein means the content of the boric acid ester compounds and the other lubricating agents) is preferably from 0.5 mg/m$^2$ to 100 mg/m$^2$, more preferably from 2 mg/m$^2$ to 100 mg/m$^2$, and most preferably from 2 mg/m$^2$ to 20 mg/m$^2$. When the coverage is 0.5 mg/m$^2$ or less, a uniform layer cannot be made, thereby leading to insufficient running properties and durability. On the other hand, when the coverage is 100 mg/m$^2$ or more, the electromagnetic properties are deteriorated by a spacing loss between the magnetic head and the magnetic recording layer of the tape.

The surface of the thin metal film can be treated with a surface active agent such as a fatty acid or various coupling agents before a protective or lubricating layer is provided thereon in order to improve adhesion between the protective or lubricating layer and the thin metal film, as described in U.S. Pat. No. 4,152,487.

The protective or lubricating layer may be a single layer or multi-layers.

Ferromagnetic thin metal films can be prepared by an electroplating method, and electroless plating method, a gas phase plating method, a sputtering method, a vapor deposition method, or an ion plating method using materials of ferromagnetic metals such as iron, cobalt, nickel, and the like or materials of ferromagnetic alloys such as Fe-Co, Fe-Ni, Co-Ni, Fe-Rh, Co-P, Co-Y, Co-La, Co-Ce, Co-Pt, Co-Sm, Co-Mn, Fe-Co-Ni, Co-Ni-P, Co-Ni-B, Co-Ni-Ag, Co-Ni-Nd, Co-Ni-Zn, Co-Ni-Cu, Co-Ni-W, Co-Ni-Re, and the like. The film thickness is generally from 0.02 to 2 microns, and preferably from 0.05 to 0.4 micron, when the film is used for a magnetic recording medium.

In addition to the above-described metals, O (as described in U.S. Pat. No. 4,239,835), N, Cr, Ga, As, Sr, Zr, Nb, Mo, Rh, Pd, Sn, Sb, Te, Pm, Re, Os, Ir, Au, Hg, Pb, Bi, or the like can be incorporated in the general range of from 0 to 50 atom% into the ferromagnetic thin metal films.

The surface roughness of the magnetic layer is not particularly limited, but when the surface has protrusions of from 10 to 1000 Å height, running properties and durability are particularly excellent. The thickness of a support is preferably from 4 to 50 microns. An underlayer may be provided on the support in order to improve adhesion and magnetic properties of the ferromagnetic thin film as described in Japanese Patent Application (OPI) Nos. 189836/83, 167830/84, and 210532/84.

The methods for forming the above-described magnetic layer are described in U.S. Pat. Nos. 4,540,618, 4,546,725, 4,539,264, 4,557,948, and 4,581,245.

Examples of supports used in the present invention include plastic bases such as polyethylene terephthalate, polyimide, polyamide, polyvinyl chloride, cellulose triacetate, polycarbonate, polyethylene naphthalate, or polyphenylene sulphide, Al, Ti, and stainless steel.

The shape of a magnetic recording medium can be a tape, a sheet, a card, or a disk, with tapes and disks are particularly preferred.

The present invention is further illustrated in more detail by the following Examples, but the present invention is not limited thereto.

EXAMPLES

On a polyethylene terephthalate film having a thickness of 13 microns, a cobalt-nickel ferromagnetic film (film thickness: 150 nm) was provided by an oblique incident evaporation method to prepare a raw fabric of a magnetic recording medium. The oblique incident evaporation was carried out in such a manner that an electron beam vapor source was used, electron beams were directed to a cobalt and nickel alloy (Co content: 80 wt %, Ni content: 20 wt %) under vacuum degree of $5 \times 10^{-5}$ Torr so that the angle of incidence was 50°. Various materials were dissolved in methyl ethyl ketone, respectively, and the resulting coating composition was coated on the thus-obtained magnetic thin metal film of a magnetic recording medium and dried to prepare samples as identified as Nos. 1 to 8 (shown in Table 1). Regarding these samples, the friction coefficient, i.e, the $\mu$ value, against a stainless steel pole, repeated running durability, and still durability under (A) 25° C. and 70% RH (relative humidity) and (B) 25° C. and 15% RH using 8 mm type VTR (video tape recorder) were measured.

The friction coefficient (i.e., the $\mu$ value) was measured by the following method. Sample tapes were slit to a width of 8 mm. And the surface of magnetic layer of the sample tapes with which a tape tension, $T_1$ of 20 g was loaded, was rubbed at a speed of 15 mm/sec, and a tape tension of $T_2$ on the surface of the fixed stainless steel pole (stainless steel: SUS 420J, 4 mm diameter). At the time, a tension, $T_2$ was measured with the tension gauge.

The friction coefficient ($\mu$) was calculated by the formula $$\mu = \frac{1}{\pi} \ln \frac{T_2}{T_1}$$

($\mu$: dynamic friction coefficient). Accordingly, as friction coefficient is smaller, running property is better. The results are shown in Table 2.

Running durability is shown in terms of number of reproductions until reproduced images are distored due to running unstability ocurring after repeated reproductions, using a tape of 50 m length mounted on a 8 mm type VTR ("FUJIX-8" M6 type, trademarked product manufactured by Fuji Photo Film Co., Ltd.), or until the running tape is stopped due to increase of the friction coefficient. Still durability is shown in terms of time until satisfactory still images are obtained when images are reproduced with the "pause" set using the same type VTR as above, with the device to limit the time for reproduction at still mode being removed.

Scratch resistance upon a repeating running test was measured by observing the surface of a tape after 300 passes using a microscope ($\times 20$). The results were evaluated on the following evaluation.

a: no scratches b: 1 to 5 scratches
c: 6 to 15 scratches
d: 16 or more scratches The above measurements were made twice, respectively, under conditions (A) and (B).

TABLE 1

| Sample No. | Materials | Amounts Coated |
|---|---|---|
| 1 | Example 1 | Tri-n-octadecyl borate | 15 mg/m$^2$ |
| 2 | Example 2 | Tridodecyl borate | 8 mg/m$^2$ |
| 3 | Example 3 | Di-n-octadecyl borate | 15 mg/m$^2$ |
| 4 | Example 4 | Dioleyl borate | 17 mg/m$^2$ |
| 5 | Example 5 | Triphenyl borate | 15 mg/m$^2$ |
| 6 | Comparative Example 1 | $(C_{16}H_{33}O)_3P=O$* | 15 mg/m$^2$ |
| 7 | Comparative Example 2 | $C_{16}H_{13}OCOC_2H_5$* | 15 mg/m$^2$ |
| 8 | Comparative Example 3 | $C_{17}H_{33}COOH$* | 15 mg/m$^2$ |

*: Known lubricating agents which was conventionally used.

TABLE 2

| Sample No. | Friction Coefficient | | Repeated Running Durability/Number | | Scratch Resistance | | Still Durability/Min. | |
|---|---|---|---|---|---|---|---|---|
| | (A) | (B) | (A) | (B) | (A) | (B) | (A) | (B) |
| 1 | 0.16 | 0.16 | >300 | >300 | a | a | >30 | >30 |
| 2 | 0.20 | 0.21 | >300 | >300 | b | b | >30 | >30 |
| 3 | 0.19 | 0.20 | >300 | >300 | a | b | >30 | >30 |
| 4 | 0.18 | 0.19 | >300 | >300 | b | b | >30 | >30 |
| 5 | 0.22 | 0.22 | >300 | >300 | c | c | >30 | >30 |
| 6 | 0.25 | 0.30 | 200 | 70 | d | d** | 22 | 8 |
| 7 | 0.27 | 0.40 | 120 | 80 | d | d** | 20 | 6 |
| 8 | 0.23 | 0.37 | 110 | 80 | d | d** | 20 | 9 |

**Running to 300 passes was impossible & 16 or more scratches were observed, respectively.

It is clear from the results of Table 2 that a magnetic recording medium of the present invention has excellent running properties and durability.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a non-magnetic support having provided thereon a ferromagnetic thin metal film, wherein a layer comprising essentially of a boric acid ester compound is provided on the ferromagnetic thin metal film, wherein said boric acid ester compound is a triester or diester having an alkyl group or alkenyl group having from 12 to 22 carbon atoms and wherein the coverage of the boric acid ester compound and any other lubricating agent(s) present is from 0.5 mg/m$^2$ to 100 mg/m$^2$.

2. A magnetic recording medium as in claim 1, wherein said boric acid ester compound has said alkyl group having from 12 to 22 carbon atoms.

3. A magnetic recording medium as in claim 1, wherein said boric acid ester compound is tri-n-octadecyl borate.

4. A magnetic recording medium as in claim 1, wherein said layer consisting essentially of said boric acid ester compound also contains a lubricating agent.

5. A magnetic recrding medium as in claim 1, wherein a coverage of the boric acid ester compound and the other lubricating agent is from 2 mg/m$^2$ to 100 mg/m$^2$.

6. A magnetic recording medium as in claim 1, wherein a coverage of the boric acid ester compound and the other lubricating agent is from 2 mg/m$^2$ to 20 mg/m$^2$.

7. A magnetic recording medium as in claim 1, wherein the weight ratio of the other lubricating agent(s)/the boric acid ester compound is from 0/100 to 90/10.

8. A magnetic recording medium as in claim 1, wherein the weight ratio of the other lubricating agent(s)/the boric acid ester compound is from 0/100 to 70/30.

9. A magnetic recording medium as in claim 1, wherein only the boric acid ester compound is present in said layer consisting essentially of the boric acid ester compound.

* * * * *